W. R. WARNER.
VIBRATION ARRESTER FOR AUTOMOBILE STEERING MECHANISM.
APPLICATION FILED APR. 29, 1909.

1,015,861.

Patented Jan. 30, 1912.

2 SHEETS—SHEET 1.

Witnesses.

Inventor.
Worcester R. Warner
by
Thurston & Woodward
Atty's.

W. R. WARNER.
VIBRATION ARRESTER FOR AUTOMOBILE STEERING MECHANISM.
APPLICATION FILED APR. 29, 1909.
1,015,861.
Patented Jan. 30, 1912.
2 SHEETS—SHEET 2.
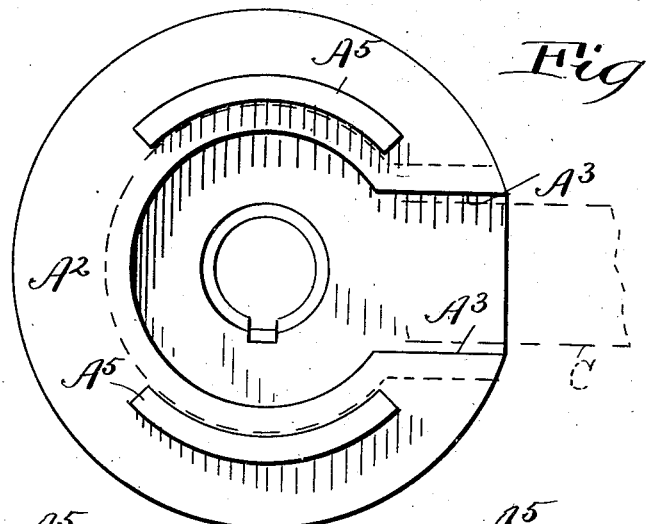
Fig. 3.
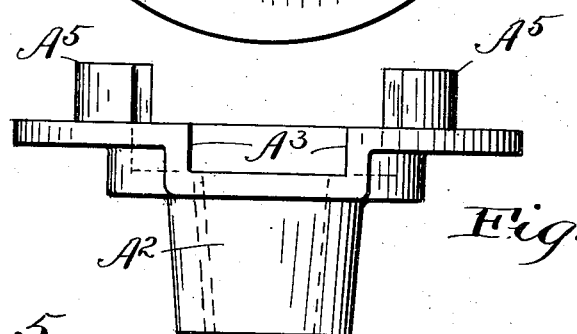
Fig. 4.
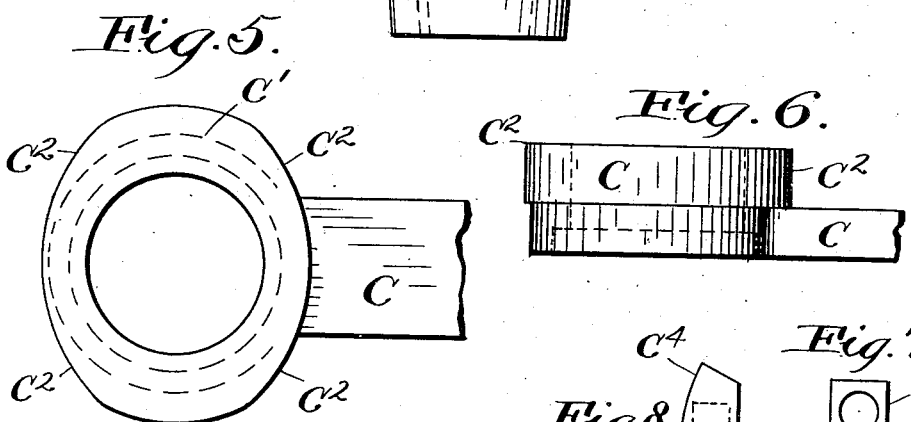
Fig. 5.
Fig. 6.
Fig. 7.
Fig. 8.
Witnesses.
Inventor

UNITED STATES PATENT OFFICE.

WORCESTER R. WARNER, OF CLEVELAND, OHIO, ASSIGNOR TO MORRIS S. TOWSON, OF CLEVELAND, OHIO.

VIBRATION-ARRESTER FOR AUTOMOBILE STEERING MECHANISM.

1,015,861.  Specification of Letters Patent.  Patented Jan. 30, 1912.

Application filed April 29, 1909. Serial No. 492,868.

*To all whom it may concern:*

Be it known that I, WORCESTER R. WARNER, a citizen of the United States, residing at Cleveland, in the county of Cuyahoga and State of Ohio, have invented a certain new and useful Improvement in Vibration-Arresters for Automobile Steering Mechanism, of which the following is a full, clear, and exact description.

The present invention is directed to means for arresting vibration in the steering connections to prevent its transmission to the steering handle.

The object of the invention has been to provide means applicable to the steering devices commonly employed in automobiles which shall eliminate the constant oscillation of the steering handle due to the constant vibration of the front axle controlled, through connecting devices, by said handle and to arrest this vibration in such manner as to impose no additional labor on the operator in steering the machine and as not to render the steering mechanism irresponsive.

Figure 1:
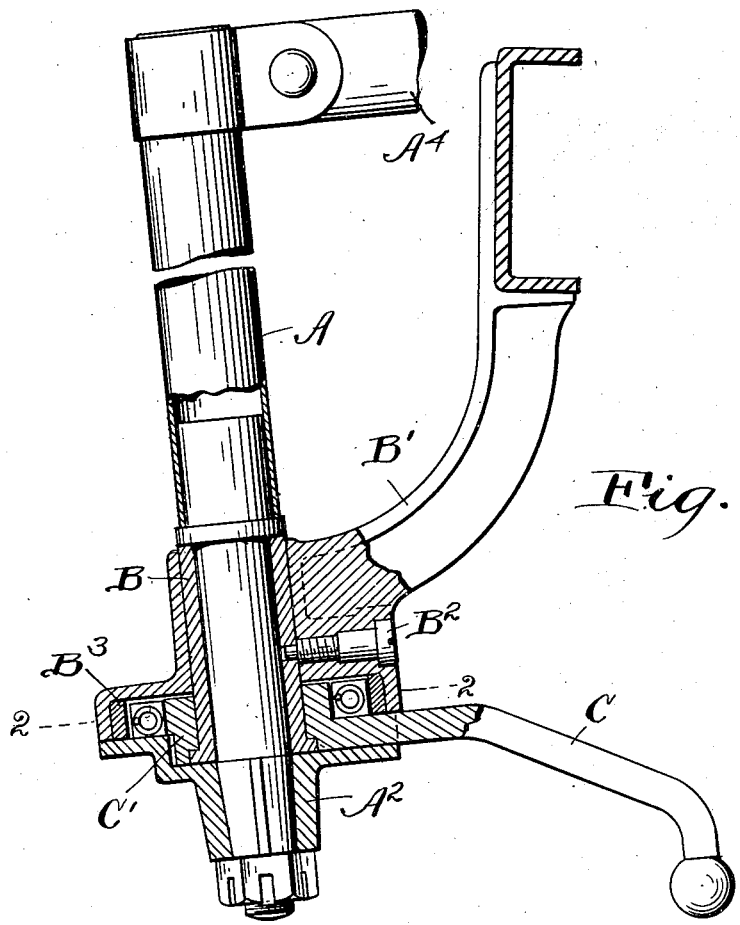
Figure 2:
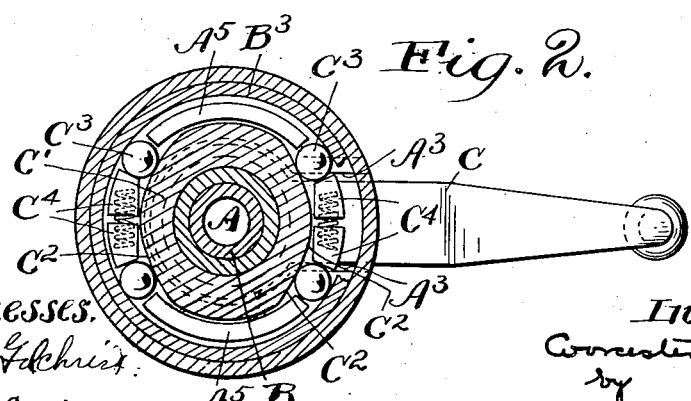

The above objects and other desirable advantages it will be seen are attained by that embodiment of my invention described in the following specification with reference to the accompanying drawings, in which;

Figure 1 is a vertical section partly in elevation showing my vibration arrester as I have applied it to the steering mechanism of an electric automobile in which the steering post is mounted in bearings supported at one side of the vehicle. Fig. 2 is a transverse section on the line 2—2 of Fig. 1. Fig. 3 is a top plan of a hub which I mount on the lower end of the steering post, which hub transmits the oscillatory motion of the post to the steering knuckle through the medium of the rock arm shown in Figs. 1 and 2. Fig. 4 is a side elevation of the hub shown in Fig. 3. Fig. 5 is a top plan view of the inner end of the rock arm showing the cam flange thereon. Fig. 6 is a side elevation of the end of the rock arm shown in Fig. 5. Figs. 7 and 8 are respectively an end elevation and top plan of the positioning blocks used for holding the locking balls in place.

In the embodiment of the invention here shown I mount the lower end of the steering post A in a bushing B of suitable material held in a supporting bracket B' fixed to the frame of the vehicle. The supporting bracket has suitable means $B^2$ for sustaining the bushing in place and is provided on its lower surface with a cup designed to receive an annular wearing band $B^3$ therein, the purpose of which will appear below. On the lower end of the steering post and keyed thereto so as to have positive rotary motion therewith is a hub $A^2$, the upper face of which is provided with suitable shoulders $A^3$, $A^3$, formed in any desired manner for transmitting oscillatory motion to a rock arm C lying between them. In the present species of the invention this rock arm has at the inner end thereof a sleeve C' by which it is fitted over the aforesaid bushing B so as to be retained in place thereby, but it is freely oscillatory relative thereto. It will be noted that the distance between the shoulders $A^3$ which transmit oscillatory motion to the rock arm from the steering post is somewhat greater than the width of the rock arm, so that the latter is capable of a certain amount of play between them before striking either shoulder. It is within this distance of play that I propose to arrest the vibration coming from the steering knuckle, by the means to be described below.

On the peripheral face of the sleeve C' I have provided cam surfaces $C^2$. Between the cam surfaces and the bearing ring held inside the fixed cup of the bracket I place steel balls $C^3$ or rollers which are, by spring pressure, held under constant thrust toward the portion of the cam surfaces having the greatest eccentricity, this being for the purpose of holding the balls in such position that any oscillation of the rock arm turning a cam surface in one direction will cause the cam to bind its ball tightly against the bearing ring and lock the cam sleeve and rock arm against further rotation in that same direction. I, of course, provide oppositely sloped cams, for the purpose of taking care of vibration in each direction; and, in the present case I have duplicated each set of cams and balls although one set would probably suffice. As a convenient method of holding the balls up into the narrower portion of the space between the cam surfaces and the bearing ring I locate two of the cam surfaces near to each other and interpose, between the binding balls therefor, a pair of blocks C⁴ with a coil compression spring between them, which spring exerts a constant thrust upon the balls to hold them in position to be bound by the oscillation of the cams.

Rigid with the hub A² and projecting from the upper face thereof into the space between the rock arm sleeve C' and the bearing ring B³ are lugs or ribs A⁵ suitably located. These ribs or lugs serve to unlock the ball or roller when the handle A⁴ is turned to throw the rock arm C in the direction in which the ball locks the cam against movement. It is plain that, by having the cam surfaces and the lugs properly positioned, the locking balls or rollers may be made effective in such manner that the vibration of the rock arm shall be arrested before it is transmitted to the shoulders of the hub, between which it lies. Should, for some reason, a locking ball slip during the vibration of the rock arm in one direction so as to permit the arm to engage one of the shoulders on the hub, it will be seen that it will not be locked against a return movement from that position, since the unlocking lug A⁵ lying behind the ball will prevent the ball from following its cam around to such an extent as to hold the latter against a return movement. By this means the rock arm will not become accidentally locked against one of the shoulders on the hub and thus transmit vibration to the steering post.
Normally the rock arm will lie somewhere in the space intermediate the two shoulders of the hub by which it is controlled and the tendency of the arm to vibrate will be arrested by the locking balls thrust into the narrow space between the cam and the bearing ring. Whatever shock may be delivered through the rock arm in this manner will be taken up by the bearing ring and the frame without being transmitted to the hub A².
When it is desired to move the rock arm by the steering handle A⁴ the rotation of the hub will move the unlocking lug A⁵ forward in the direction in which rotation is desired and take the ball adjacent thereto in the same direction, while the appropriate shoulder on the hub will come into engagement with the rock arm and give it a similarly directed rotation.

It will be seen that the mechanism permits the full amount of movement necessary for the purposes for which it is adapted and effectually attains the object of the invention sought in arresting vibration of the steering knuckle before it is transmitted to the steering handle, but without interfering with the responsiveness of the steering mechanism and without imposing any labor upon the operator.

Having thus described my invention, I claim:

1. In a steering mechanism for automobiles, a fixed bearing bracket having an annular recess, a steering post rotatably mounted in said bracket, a hub member secured to and rotatable with the post and having an annular recess concentric with the post and a slot extending outwardly in the plane of and from the recess and forming a pair of shoulders, a steering lever having a cam head seated in said recess and an arm passing loosely through the slot between the shoulders, the cam head projecting into the annular recess of the bearing bracket, rollers arranged between the cam portion of the head and the wall of the recess in the annular bearing member and adapted to be jammed between the same to limit the vibratory movement of the lever, and means carried by said hub member and adapted to engage and loosen the rollers when said member is turned by the post.

2. In a steering mechanism for automobiles, a steering post, a bracket supporting the same and having a recessed portion with an annular flange on one side arranged concentrically with respect to the post, an annular hub member secured to and movable with the post and engaging the flange so as to form an annular closed chamber therewith, said member having a pair of shoulders spaced apart, a steering lever having a head with cam surfaces located in said annular chamber about the post and an arm projecting outwardly from the chamber loosely between said shoulders, rollers located between said annular flange and the cam head and adapted to be jammed against the annular bearing surface by the cam head when the steering lever vibrates, and means carried by said member for loosening the rollers so as to permit the post to transmit movement to the lever.

3. In a steering mechanism for automobiles, a steering post, a bracket supporting the same and having a substantially annular recessed portion through which the post extends and a depending annular flange concentric with the post, a hub member mounted on the lower end of the post and engaging the flange so as to form therewith an annular closed chamber, said member having a recess or depression concentric with the post and having a substantially radial slot extending outwardly from said recess and forming a pair of shoulders, a steering lever having a cam head located in said chamber and seated in the recess of said member, said lever having an arm projecting outwardly loosely through said slot between the shoulders, spring pressed balls between the cam head of the lever and the depending flange of said bracket, said balls being adapted to be jammed between the cam head and an annular bearing surface within the flange by movement of the arm of the steering lever in said slot, and lugs projecting upwardly from said member and adapted to loosen the balls so that the post may transmit movement to the steering lever.

In testimony whereof, I hereunto affix my signature in the presence of two witnesses.

WORCESTER R. WARNER.

Witnesses:
  J. M. WOODWARD,
  H. R. SULLIVAN.